United States Patent
Yamazaki et al.

(12) 
(10) Patent No.: US 6,809,774 B1
(45) Date of Patent: Oct. 26, 2004

(54) WRIST-CARRIED CAMERA AND WATCH-TYPE INFORMATION EQUIPMENT

(75) Inventors: Akihisa Yamazaki, Asaka (JP); Koji Sagae, Asaka (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 09/432,090

(22) Filed: Nov. 2, 1999

(30) Foreign Application Priority Data

Nov. 6, 1998 (JP) ............................................ 10-316054

(51) Int. Cl.$^7$ .............................................. H04N 5/225
(52) U.S. Cl. ...................................... 348/373; 348/376
(58) Field of Search ................................ 348/373, 374, 348/375, 376, 61, 73, 207.99; 396/318, 56, 336; 368/10, 71, 21; 340/5.82, 7.55; 455/556.1, 11.1, 344

(56) References Cited

U.S. PATENT DOCUMENTS

| | | | | |
|---|---|---|---|---|
| 4,362,398 A | * | 12/1982 | Jackson | 368/240 |
| 5,329,501 A | * | 7/1994 | Meister et al. | 368/10 |
| 5,475,653 A | * | 12/1995 | Yamada et al. | 368/10 |
| 5,572,196 A | * | 11/1996 | Sakumoto et al. | 340/7.55 |
| 5,572,488 A | * | 11/1996 | Yamada et al. | 368/10 |
| 5,977,535 A | * | 11/1999 | Rostoker | 250/208.1 |
| 6,359,837 B1 | * | 3/2002 | Tsukamoto | 368/10 |
| 2001/0011025 A1 | * | 8/2001 | Ohki et al. | 455/556 |
| 2001/0017663 A1 | * | 8/2001 | Yamaguchi et al. | 348/373 |
| 2002/0180586 A1 | * | 12/2002 | Kitson et al. | 340/5.82 |

FOREIGN PATENT DOCUMENTS

| | | | | |
|---|---|---|---|---|
| JP | 62009289 A | * | 10/1987 | G04G/1/00 |
| JP | 05-209973 | * | 8/1993 | |
| JP | 8278382 | | 10/1996 | |
| JP | 1090442 | | 4/1998 | |
| JP | 10108152 | | 4/1998 | |

* cited by examiner

*Primary Examiner*—Aung Moe
(74) *Attorney, Agent, or Firm*—Birch, Stewart, Kolasch & Birch, LLP

(57) ABSTRACT

In a wrist-carried camera having a watch function, a body including a taking lens is provided in such a manner as to freely rotate with respect to a band part through a rotation mechanism, and a release switch is provided at the unrotated band part. Setting a camera mode stops the hands of the watch in the direction of a taking lens so as to display an image-capturing direction. A rotary bezel is arranged around a display part, and marks indicating modes of the camera are formed on the bezel. A hand of the watch is also used as an indicator for pointing the mode display mark in the bezel. Setting the mark in the bezel to the indicator switches and displays the operation modes.

19 Claims, 9 Drawing Sheets

F I G. 1 0
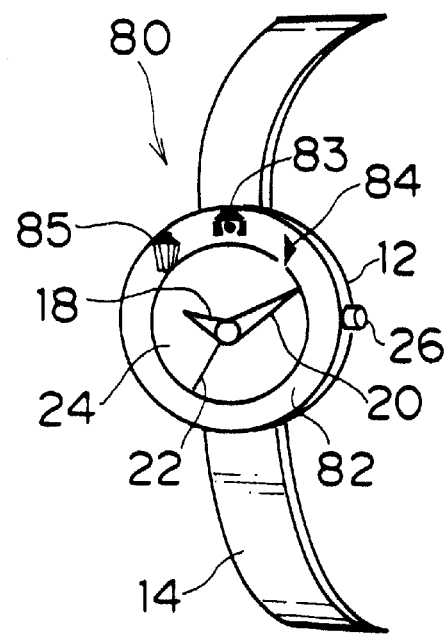
F I G. 1 1
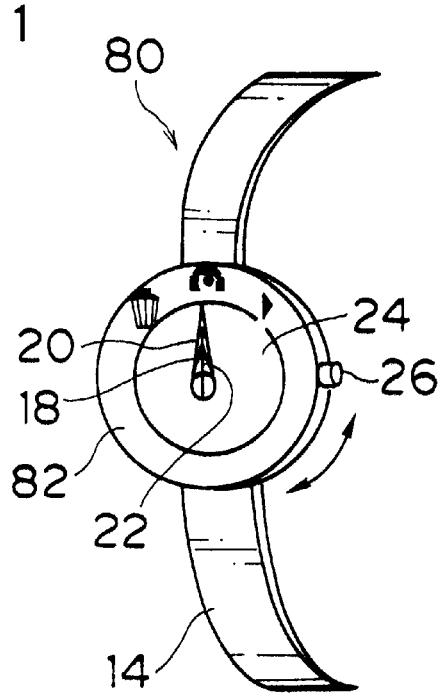

F I G. 1 2
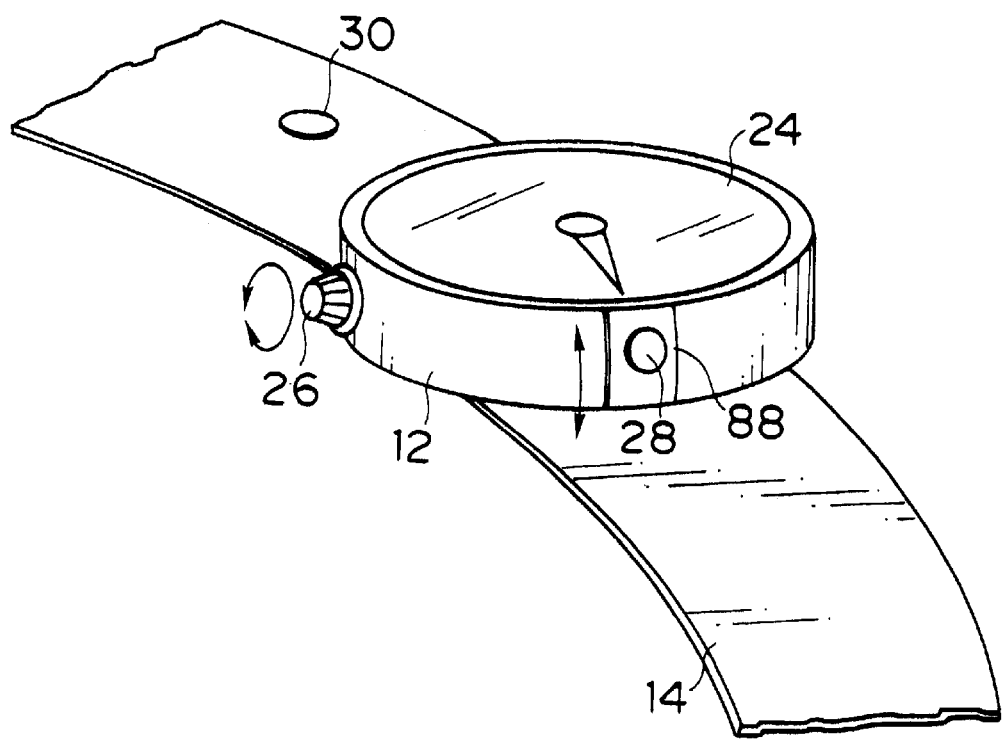

WRIST-CARRIED CAMERA AND WATCH-TYPE INFORMATION EQUIPMENT

BACKGROUND OF THE INVENTION

1. Field of the Invention

The present invention relates generally to a wrist-carried camera and watch-type information equipment, and more particularly to a camera shaped to be worn about the wrist of an operator like a wristwatch, a portable information terminal and other portable small information equipment.

2. Description of Related Art

In the field of electronic cameras such as a digital camera, a great deal of effort was put into the miniaturization of the cameras. Japanese Patent Provisional Publication Nos. 5-209973, 8-278382, 10-108152, etc. disclose a variety of wrist-carried cameras. In the conventional wrist-carried camera, however, the position of the taking lens and the direction of an optical axis of the taking lens are fixed. Accordingly, the operator has to put the wrist with the worn wristwatch-type camera in front of the body to use the functions of the camera, and the operator has to move the body or the wrist to turn the taking lens toward the object. In this case, the operator has to move the wrist in an unnatural way sometimes in order to adjust the angle of view desirably.

Japanese Patent Provisional Publication No. 10-90442 discloses the combination of a wristwatch and a radiotelephone. It proposed to use hands of an analog watch as indicators, which do not only represent time but also indicate which button has been pressed among control buttons arranged at the circumference of the watch. It is, however, impossible to determine at first sight whether the hands of the watch represent the time or indicate the control button.

SUMMARY OF THE INVENTION

In view of the foregoing, the first object of the present invention is to provide a wrist-carried camera that makes it easier to adjust the angle of view and never imposes a burden on an operator. The second object of the present invention is to provide portable watch-type information equipment that makes it possible to identify a subject of display on a display part.

To achieve the above-mentioned object, the present invention is directed to a wrist-carried camera, comprising: a camera part including a taking lens and an imaging device capable of converting an image of an object formed through the taking lens into an electronic image signal; a band part capable of being worn about a wrist of an operator; and a connection mechanism connecting the camera part and the band part, the connection mechanism being attached on a portion of the band part and rotatably supporting the camera part.

The operator can wear the wrist-carried camera of the present invention around the wrist like a wristwatch. The camera part is capable of rotating with respect to the band part due to the rotation mechanism, so that the taking lens can be turned to a desired direction according to the object. Therefore, the angle of view can easily be adjusted at hand, and the operator does not have to take up an unnatural stance in order to take a picture.

Preferably, an image-storing start switch is provided at a part that is never rotated by the rotation mechanism, and hence, the image-storing start switch will never be moved by the rotation of the camera part. It is therefore easy to operate the wrist-carried camera.

The present invention is also directed to a watch-type camera comprising: a timepiece; a display part capable of, in a first mode, representing time by means of an hour hand, a minute hand and a second hand according to the timepiece; a camera part including a taking lens and an imaging device capable of, in a second mode, converting an image of an object formed through the taking lens into an electronic image signal; a mode switching device capable of switching the first and second modes; and a controller which turns at least one of the hour hand, the minute hand and the second hand to a direction of an optical axis of the taking lens when the second mode is set. The hour hand, the minute hand and the second hand may be existing members; and the display part may comprise a mechanism driving the hour hand, the minute hand and the second hand. Alternatively, the display part may comprise an electronic display which displays images of the hour hand, the minute hand and the second hand.

The present invention is also directed to watch-type information equipment, comprising: a timepiece; a display part which represents time by means of an hour hand, a minute hand and a second hand according to the timepiece in a first mode, and which represents information other than the time in a second mode; and a controller which changes actions of the second hand in accordance with switching between the first and second modes.

To change the actions of the second hand, the second hand is stopped or the display of the second hand is erased. The actions of the second hand are changed in the second mode for displaying information other than the time in the information equipment, which has a watch function for analog-displaying the time, and other functions other than the watch. Thus, the operator can easily identify the present mode of the information equipment.

The present invention is also directed to the watch type information equipment, further comprising: a camera part including a taking lens and an imaging device capable of, in the second mode, converting an image of an object formed through the taking lens into an electronic image signal.

The present invention is also directed to watch type information equipment comprising: a timepiece; a display part which represents time by means of an hour hand, a minute hand and a second hand according to the timepiece in a first mode, and which represents information other than the time in a second mode; a mode display member rotatably surrounding the display part, the mode display member being provided with a plurality of marks representing modes in the second mode; and a controller which stops, in the second mode, at least one of the hour hand, the minute hand and the second hand to utilize the at least one of the hour hand, the minute hand and the second hand as an indicator indicating one of the marks of the mode display member.

According to the present invention, the mode of the equipment is displayed on the rotatable mode display member, and the hand of the watch is also used as an indicator. This eliminates the necessity for a special indication means and makes it easier to display the mode.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 10 is an outside drawing showing the front side of an electronic camera according to the third embodiment of the present invention;

FIG. 11 is a view showing an example of a display in a camera mode of an electronic camera according to the third embodiment of the present invention; and FIG. 12 is a perspective view showing an example of an electronic camera, which has a tilting mechanism arranged at a taking lens.

DETAILED DESCRIPTION OF THE PREFERRED EMBODIMENT

This invention will be described in further detail by way of example with reference to the accompanying drawings.

Figure 1:
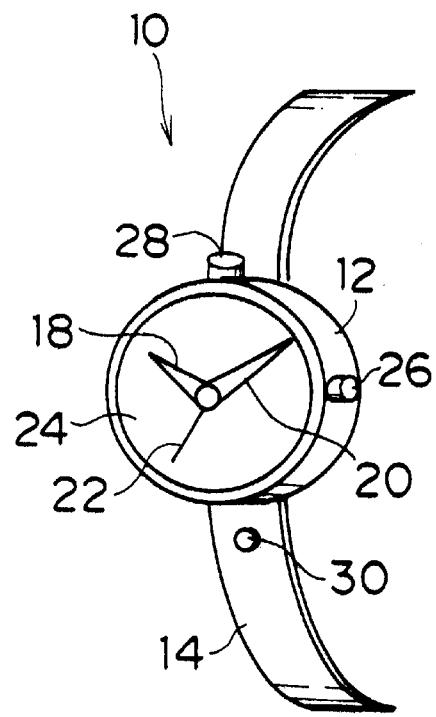
FIG. 1 an outside drawing showing the front of a wrist-carried electronic camera according to the first embodiment of the present invention.
Figure 2:
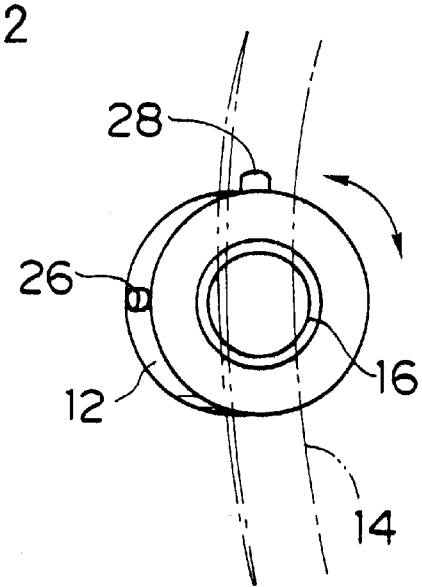
FIG. 2 is an outside drawing showing the backside of an electronic camera in FIG. 1.
Figure 3:
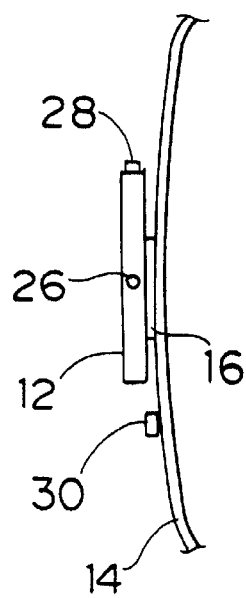
FIG. 3 is a side view showing an electronic camera in FIG. 1.

FIG. 1 is an outside drawing of the front of a wrist-carried electronic camera 10 according to the first embodiment of the present invention. FIGS. 2 and 3 are a back perspective view and a side view, respectively, of the electronic camera 10. As shown in FIGS. 1–3, the electronic camera 10 comprises a body 12 having watch functions and camera functions and a band 14 capable of being worn about a wrist of an operator. Thus, the electronic camera 10 is shaped like a wristwatch in such a manner as to be worn about the wrist of the operator. The body 12 connects to a portion of the band 14 through a rotary mechanism 16, which supports the body 12 rotatably on a normal line of the portion of the band 14. Thus, the body 12 is capable of turning on an axis perpendicular to a tangent plane of the surface of the connecting portion of the band.

The body 12 has a so-called analog watch type display part 24 provided with an hour hand 18, a minute hand 20 and a second hand 22. A stem 26 is arranged at the right side of the body 12 in FIG. 1 as is the case with an ordinary wristwatch (in the direction of three o'clock on the display of the watch). A taking lens 28 is arranged at the top side of the body 12 (in the direction of twelve o'clock on the display of the watch). This is the standard arrangement, which aims at directing an optical axis of the taking lens 28 toward an object in front of the operator, who is putting his wrist with the worn camera 10 in front of his body. The taking lens 28 and the stem 26 are not necessarily provided at the above-mentioned positions. The taking lens 28 may be buried in the body 12.

A solid state imaging device 34 (see FIG. 6) such as a CCD is arranged behind the taking lens 28. A processing circuit for processing signals read from the imaging device, a memory, a central processing unit (CPU), and a timepiece or watch operating part are disposed in the body 12.

An imaging start instruction switch or a release switch 30 is attached to the band 14. If a release switch were provided at the body 12, the release switch would shift with the rotation of the body 12. To address this problem, the release switch 30 is arranged on the band 14, which is not rotated.

Although not illustrated in the drawings, a mode selector, a variety of control buttons, and other control members are arranged at appropriate positions of the band 14 and the body 12. Of course, it is possible to use the stem 26 as the control member such as the mode selector.

Figure 4:
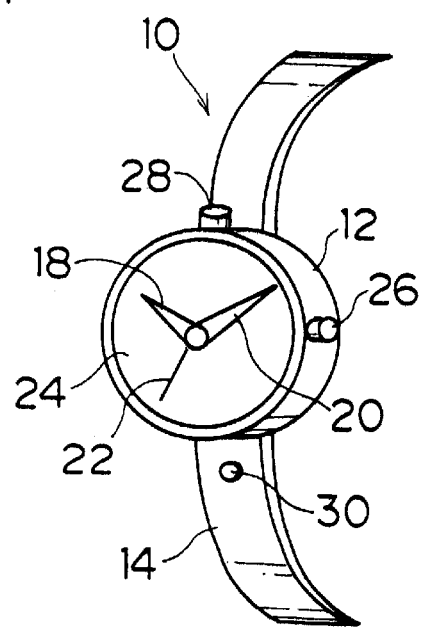
FIG. 4 is a view showing an example of a time display in a watch mode.
Figure 5:
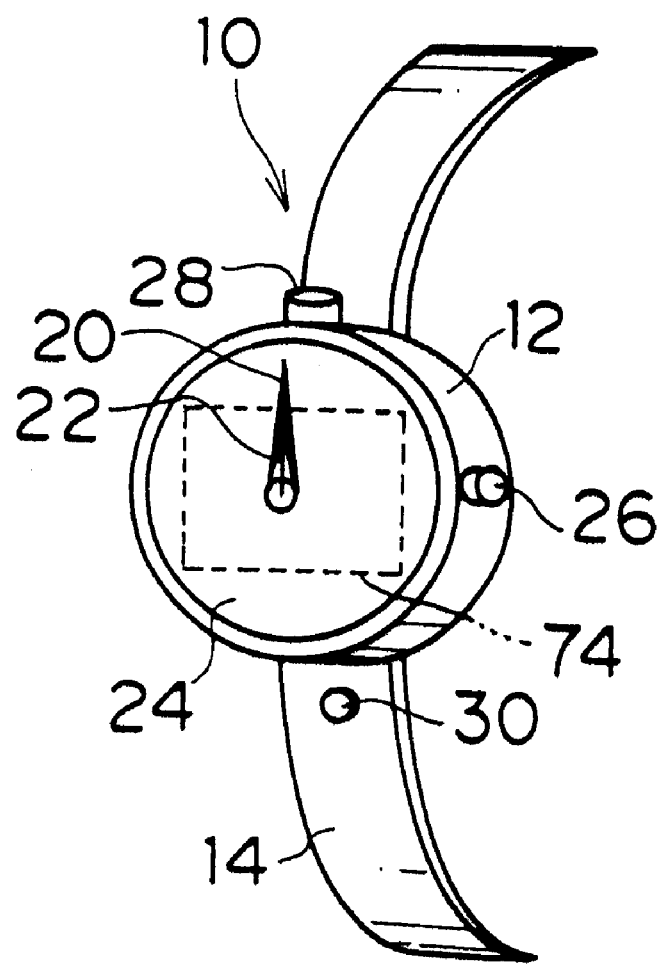
FIG. 5 is a view showing an example of the display in a camera mode.

FIG. 4 shows an example of the display in a watch mode. When the electronic camera 10 is in the watch mode; the hour hand 18, the minute hand 20 and the second hand 22 are driven by the watch operating part according to the rules of the analog time representation system. If the electronic camera 10 is set to the camera mode; the hour hand 18, the minute hand 20 and the second hand 22 are stopped in the state of pointing to twelve o'clock and along the optical axis of the taking lens 28 (i.e., an image-capturing direction) as shown in FIG. 5. The switching of the display according to the switching of the modes will be described later in further detail.

Figure 6:
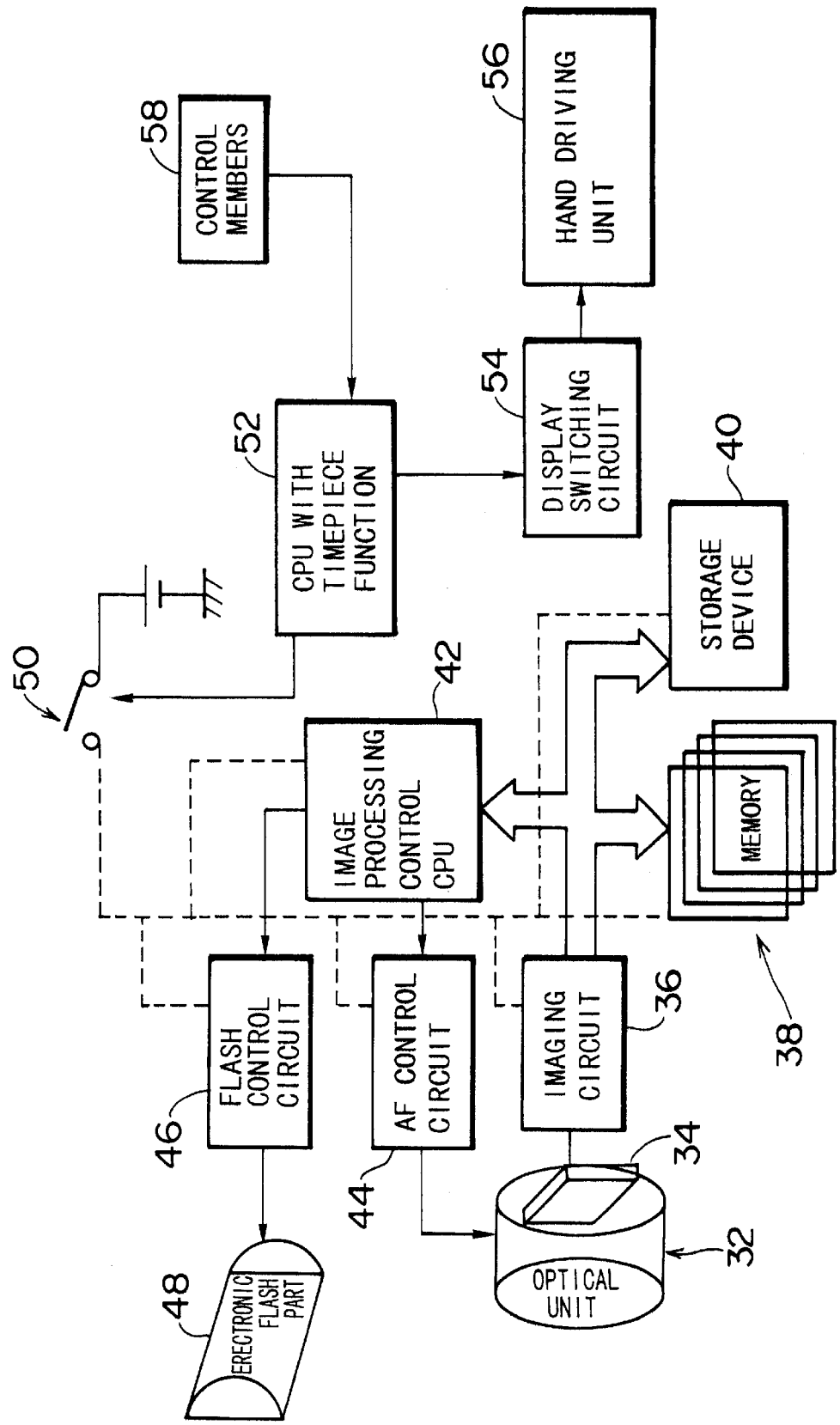
FIG. 6 is a block diagram showing an electronic camera according to the first embodiment.

FIG. 6 is a block diagram showing the electronic camera 10. The electronic camera 10 comprises an optical unit 32, the solid state imaging device 34, an imaging circuit 36, a memory 38, a storage device 40, an image processing control CPU 42, an autofocus (AF) control circuit 44, a flash control circuit 46, an electronic flash part 48, a camera power supply control switch 50, a CPU with timepiece functions 52, a display switching circuit 54, a hand driving unit 56 and a variety of control members 58.

The optical unit 32 includes the taking lens 28 (see FIG. 1), and a light from the object enters a light receiving surface of the imaging device 34 through the optical unit 32. The light received by the imaging device 34 is photo-electrically converted, and is sequentially read as image signals. The imaging circuit 36 includes an analog processing part such as a CDS clamp and a gain control amplifier, an A/D converter, and known digital image processing circuits such as a luminance signal generating circuit, a color differential signal generating circuit and a gamma correcting circuit. The imaging circuit 36 processes the signals read from the imaging device 34 in a predetermined manner under the control of the image processing control CPU 42, so that the signals can be converted into electronic image data in digital form.

The image data captured in response to the operation of the release switch 30 (see FIG. 1) included in the control members 58, is stored in the memory 38, and is processed in a predetermined manner such as compression. Thereafter, the processed data is recorded through the storage device 40 in a storage medium.

The electronic camera 10 has a known automatic exposure adjustment (AE) function and an AF adjusting device. Only turning the taking lens 28 toward the object adjusts the exposure to the optimum, and the AF control circuit 44 automatically focuses the taking lens 28. If a flash operation mode is set to an automatic flash mode, the flash control circuit 46 automatically drives the electronic flash part 48 in order to capture an image of the object at a low luminance with the proper exposure.

The camera power supply control switch 50 is turned on and off according to control signals outputted from the CPU 52. In the watch mode, the switch 50 is off. Setting the camera mode turns on the switch 50 so as to supply the power to the camera block. The dotted lines in FIG. 6 conceptually represent the supply of the power to each circuit in the camera block.

The hand driving unit 56 includes a drive mechanism for operating the hour hand 18, the minute hand 20 and the second hand 22. The CPU 52 controls the hand driving unit 56 through the display switching circuit 54.

The CPU 52 has built-in timepiece functions to serve as the watch operating part. The CPU 52 switches the mode between the watch mode and the camera mode in accordance with the signals outputted from the mode selector included in the control members 58. More specifically, if the watch mode is selected, the CPU 52 turns off the camera power supply control switch 50, and sets the display switching circuit 54 to a first display mode or a time display mode. Then, the CPU 52 controls the hand driving unit 56 as is the case with the ordinary analog watch to drive the hands 18, 20 and 22, thereby operating the hands 18, 20 and 22 so that the current time can be shown on the display part 24.

If the camera mode is selected, the CPU 52 turns on the camera power supply control switch 50 to supply the power to the camera block, and sets the display switching circuit 54 to a second display mode or a camera display mode. Then, the CPU 52 controls the hand driving unit 56 to turn the hour hand 18, the minute hand 20 and the second hand 22 (or at least one of there) to the direction of the optical axis of the taking lens 28. Then, the CPU 52 stops the driving of the hands 18, 20 and 22.

Since the hands of the watch represent the direction of the taking lens 28, the operator can easily know the image-capturing direction even if the body 12 is rotated. Moreover, it is particularly desirable to utilize the hands of the watch for displaying the direction of the optical axis of the taking lens, since it is not practical to use an optical finder in the wrist-carried camera shaped like a wristwatch.

Stopping the second hand 22 in the camera mode makes it clear the distinction between the watch mode and the camera mode. Thus, the second hand 22 functions as a mode display device for letting the operator know whether the electronic camera 10 is in the watch mode or the camera mode.

Pressing the release switch 30 in the camera mode supplies an image-storing start signal or a release signal to the CPU 52, and a predetermined image-storing operation starts in response to the release signal. For example, at the low luminance in the automatic flash mode, the CPU 52 drives the electronic flash part 48, and captures the image signals read from the solid state imaging device 34 in response to the release signal into the memory 38 through the imaging circuit 36. The image signals are then compressed or the like to be stored through the storage device 40 in the storage medium. The storage medium may be either an extremely small removable memory card or a flash memory built in the electric camera 10.

The image data stored in the storage medium can be read through the image processing control CPU 42, and the read image data are expanded in an contraction/expansion circuit. Then, the image data can be outputted to another external equipment through an output part or a communication part (not shown).

Figure 7:
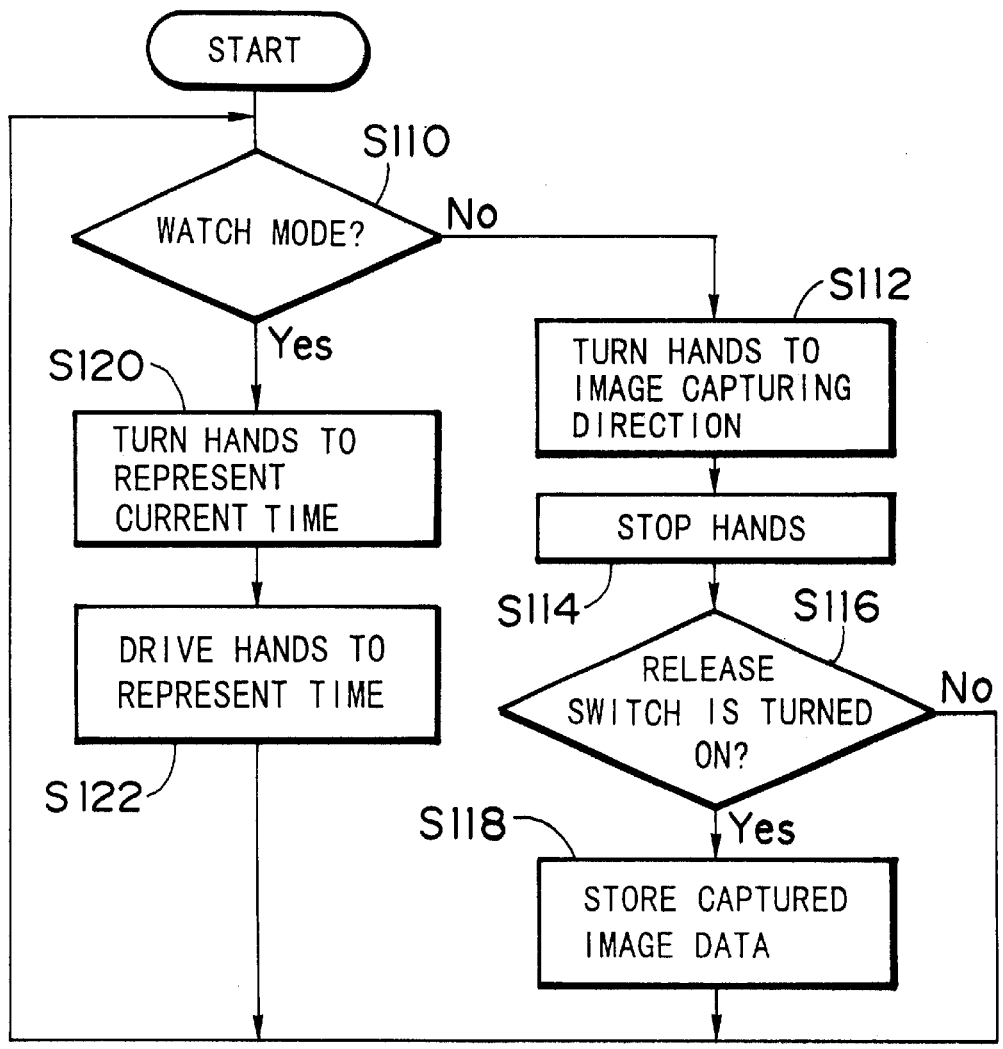
FIG. 7 is a flow chart showing the procedure for controlling an electronic camera according to the first embodiment.

FIG. 7 shows a flow chart showing the procedure for controlling the electronic camera 10, which is constructed in the above-mentioned manner.

As shown in FIG. 7, on the start of the processing, the CPU 52 determines whether the watch mode or the camera mode is selected in accordance with the detection results of the signals outputted from the mode selector included in the control members 58 (S110). If the camera mode is selected, the CPU 52 turns the hands 18, 20 and 22 of the watch in the same direction as the optical axis of the taking lens 28, in other words, to twelve o'clock on the display (S112), and stops the hands 18, 20 and 22 there.

Then, the CPU 52 determines whether the release switch 30 has been pressed or not (S116). If the release switch 30 is pressed, the CPU 52 stores the captured image data through the storage device 40 in the storage medium as described with reference to FIG. 6 (S118). If the release switch 30 is not pressed at S116, the processing returns to S110.

If the watch mode is selected at S110, the CPU 52 turns off the power supply of the camera block, which is not in use, and turns the hands 18, 20 and 22 to represent the current time (S120). Then, the CPU 52 drives the hands 18, 20 and 22 to represent the time with the timepiece functions of the CPU 52 (S122).

A description will now be given of the operation of the electronic camera 10 according to this embodiment.

When the watch mode is switched to the camera mode by operating the mode selector or the control member such as the stem 26, the hands 18, 20 and 22 are turned to the direction of the taking lens 28. Therefore, the operator can easily know the image-capturing direction and adjust the angle of view according to the direction of the hands. Since the second hand 22 stops in the camera mode, it is possible to know whether the watch mode or the camera mode is set in accordance with the movement of the second hand 22.

It is particularly advantageous that the operator can easily know the image-capturing direction in the wrist-carried camera that is constructed in such a manner that the image-capturing direction is changed by rotating the body 12. In the case of a lens-buried camera in which the taking lens 28 does not projects from the rim of the body, it is difficult to know the image-capturing direction from the outside. In this case, the handiness can be improved by representing the direction of the taking lens by utilizing the hands of the watch as mentioned above.

The electronic camera 10 of this embodiment is constructed in such a manner that the body 12 with the taking lens 28 is rotatable with respect to the band 14. Therefore, the taking lens 28 can easily be turned toward a desired object by rotating the body 12 in the camera mode. Thus, the operator does not have to move the body or the wrist in an unnatural way, and the operator is not physically burdened.

Moreover, the release switch 30 is provided at the unrotating band 14, and therefore, the release switch 30 is fixed at a predetermined position regardless of the rotation of the body 12. This facilitates the operation of the release switch 30. It is also possible to turn the taking lens 28 toward the operator by rotating the body 12, and thus, the operator can easily capture an image of oneself.

In this embodiment, all of the hour hand 18, the minute hand 20 and the second hand 22 are turned to the twelve o'clock (along the optical axis of the taking lens 28) on the display 24; however, the present invention should not be restricted to this. All the hands of the watch do not necessarily point to the twelve o'clock, and at least predetermined one of the hands may represent the image-capturing direction.

The idea that the hand of the watch is used to represent the direction of the taking lens 28 in the camera mode may be applied to a wide variety of watch-type cameras such as a wristwatch-type camera that is not provided with the rotation mechanism 16, and a watch-type camera that is not provided with the band (e.g., a pocket-watch-type camera).

The hands of the watch are not restricted to the existing mechanical structures, but they may be embodied by displaying on a display unit such as an onscreen display. According to the second embodiment, the hands of the watch are embodied by the display on the display unit.

A description will now be given of the second embodiment of the present invention.

Figure 8:
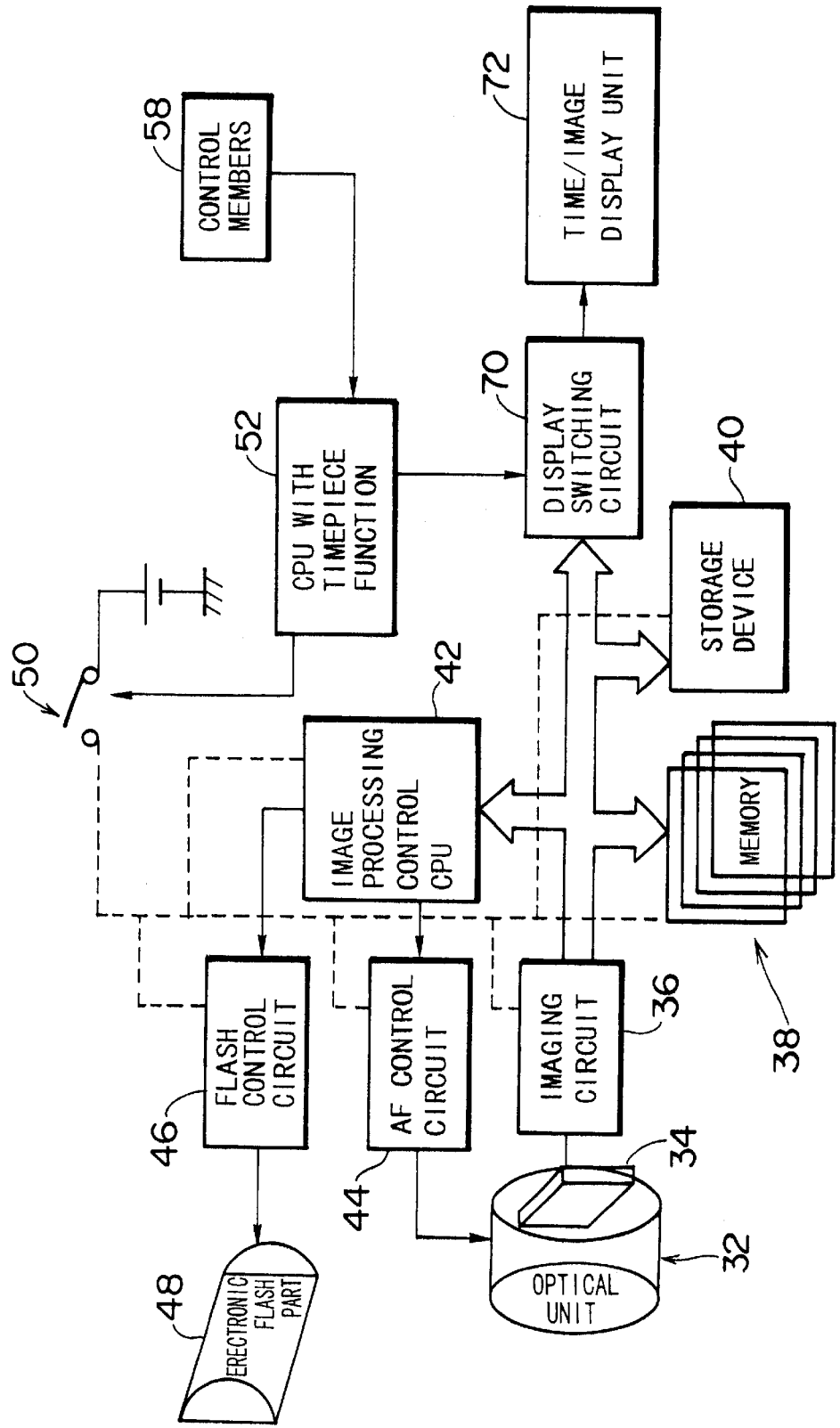
FIG. 8 is a block diagram showing an electronic camera according to the second embodiment of the present invention.

FIG. 8 is a block diagram showing the electronic camera according to the second embodiment of the present invention. Parts similar to those described with reference to FIG. 6 are denoted by the same reference numerals, and they will not be described. The electronic camera of the second embodiment is provided with a display switching circuit 70 and a display unit 72 instead of the display switching circuit 54 and the hand driving unit 56 in FIG. 6.

The display unit 72 such as a liquid crystal display is built in the body 12 in FIG. 1. More specifically, a display screen of the display unit 72 is arranged at a part corresponding to the display part 24 of the body 12. The display unit 72 can switch displaying and not displaying images of the hour hand 18, the minute hand 20 and the second hand 22 according to the display switching circuit 70. The display unit 72 is used to represent the time with the images of the hands, and the display unit 72 is also used to display a captured image.

In the watch mode, the hands of the watch are displayed on the screen of the display unit 72, and the present time is represented according to the rules of the analog time representation system. In the camera mode, the hands of the watch are not displayed, and the image data captured through the solid state imaging device 34 is supplied to the display unit 72 through the display switching circuit 70 so that the captured image can be displayed on the screen of the display unit 72.

If a movie image, which is captured by the camera before the instruction is given to start the image-storing, is displayed on the display unit 72, the operator can determine the angle of view while looking at the movie image. In this case, however, the battery is exhausted quickly.

To address this problem, it is preferable to provide a switching device capable of turning on and off the display of the movie image on the display unit 72. If the operator selects an power-saving mode or a movie-off mode, the power supply of the camera block is turned off to save the power, and the hand of the watch on the display unit 72 is turned to the direction of the optical axis of the taking lens 28 as shown in FIG. 5, thus indicating the direction of the optical axis of the taking lens 28 or the image-capturing direction. The operator can adjust the optical axis of the taking lens 28 with reference to the indication of the hand. Then, the depression of the release switch 30 turns on the power supply of the camera block to execute the image capturing and storing.

If the operator selects the movie-on mode, the hands of the watch are not displayed, and the movie image is displayed on the screen of the display unit 72. In FIG. 5, the broken line imaginarily indicates a movie image display area 74 if the display unit 72 is used as the display part 24.

Figure 9:
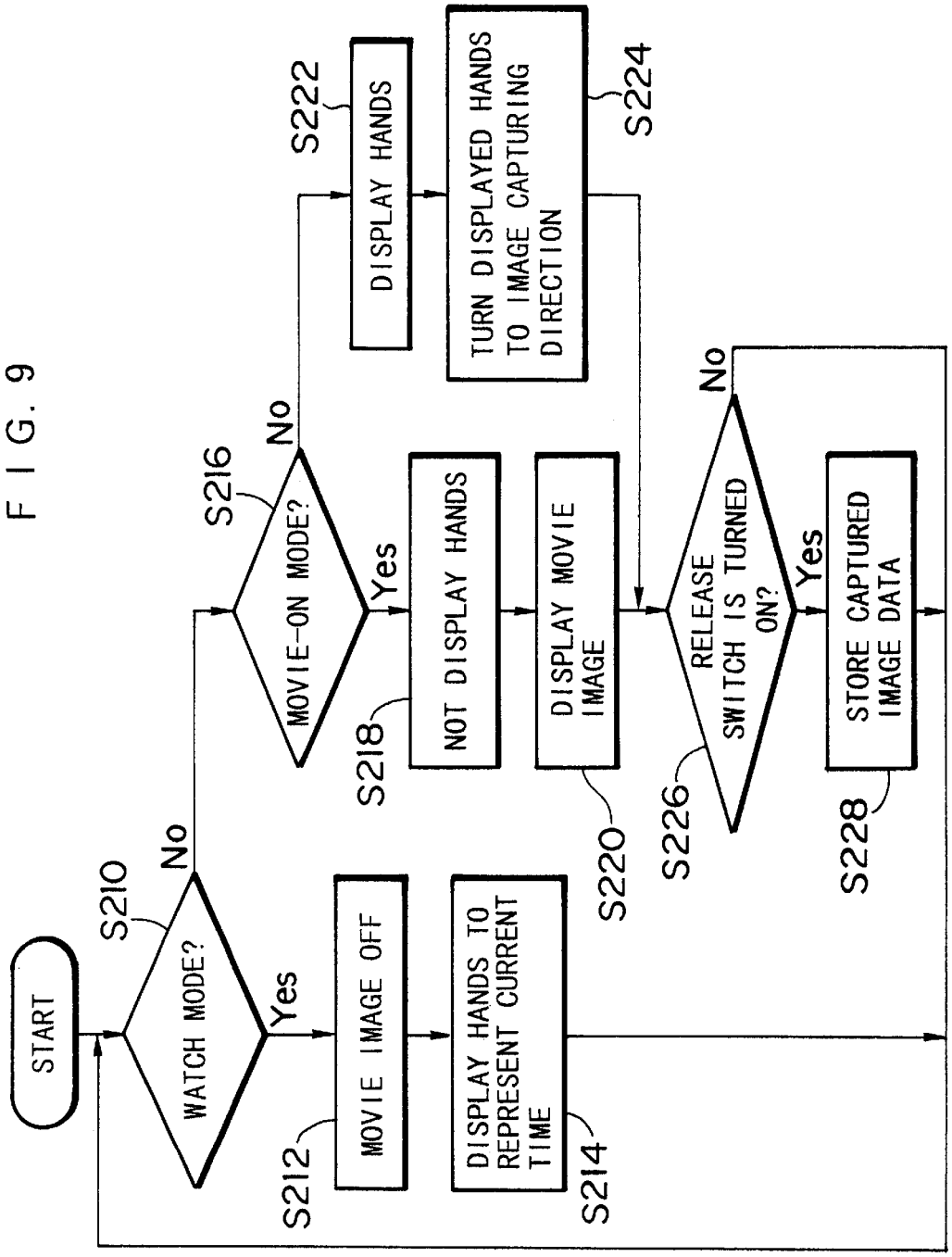
FIG. 9 is a flow chart showing the procedure for controlling an electronic camera according to the second embodiment.

FIG. 9 is a flow chart showing the procedure for controlling the electronic camera according to the second embodiment, which is constructed in the above-mentioned manner. As shown in FIG. 9, the CPU 52 determines whether the watch mode or the camera mode is selected according to the detection results of the signals inputted from the mode selector included in the control members 58 (S210). If the watch mode is selected, the power supply of the camera is turned off so as not to display the movie image (S212). Then, the hands of the watch are displayed on the display part 24 while being turned to the positions for representing the present time (S214).

If the camera mode is selected at S210, the CPU 52 determines whether the movie-on mode is set or not (S216). If the movie-on mode is determined as being selected according to the detection of the signals inputted from the mode selector included in the control members 58, the hands of the watch are not displayed (S218), and the power supply of the camera is turned on to drive the solid state imaging device 34, the imaging circuit 36, etc. so as to display the movie image on the display unit 72 (S220).

If the movie-off mode is determined as being selected at S216, only the hands of the watch are displayed (S222) and they are turned to the direction of the optical axis of the taking lens 28 (S224). Then, whether the release switch 30 has been pressed or not is determined (S226). If the release switch 30 has not been turned on, the process returns to S210 to wait for the input of the image-storing start instruction. If the operator presses the release switch 30, the image-storing is performed, and the captured image data is stored through the storage device 40 in the storage medium (S228).

In the movie-on mode, canceling the unnecessary display of the hands of the watch makes the movie image easier to see. In the movie-off mode, since the hands are displayed to indicate the direction of the taking lens 28, the image-capturing direction can be known easily.

A description will now be given of the third embodiment of the present invention.

FIG. 10 shows an embodiment in which the watch-type information equipment according to the present invention is applied to the wrist-carried electronic camera. Parts similar to those described with reference to FIG. 1 are denoted by the same reference numerals, and they will not be described here. The hands of the watch may be mechanical as is the case with the first embodiment, or the display unit may be used to display the images of hands of the watch as is the second embodiment.

The taking lens (not illustrated in FIG. 10) of an electronic camera 80 in FIG. 10 is incorporated in the body 12, and does not project from the body 12. The taking lens is arranged in the direction of the twelve o'clock as is the case with in FIG. 1.

A bezel 82 is arranged to surround the display part 24, and is rotatably attached to the top of the body 12. Marks 83, 84 and 85 indicating the operation modes of the camera are formed on the bezel 82, and the bezel 82 functions as a mode selecting member. Examples of the camera operation modes are an image-storing mode for capturing and storing images, a reproduction mode for reproducing stored images, and an erasing mode for erasing unnecessary images among stored images. In FIG. 10, the central mark 83 indicates the image-storing mode, the right mark 84 indicates the reproduction mode, and the left mark 85 indicates the erasing mode. Other marks may also be formed to indicate other operation modes.

In the normal watch mode, the hour hand 18, the minute hand 20 and the second hand 22 are driven to represent the time according to the rules of the analog watch display. In the camera mode, however, all the hour hands 18, the minute hand 20 and the second hand 22 (or at least one of them) are fixed in the direction of the twelve o'clock on the display of the watch to indicate the image-capturing direction. These hands are also used as an indicator for pointing to one of the mode display marks (83, 84, 85) on the bezel.

The camera operation mode is set by rotating the bezel 82 to set the desired mark to the hands (18, 20, 22) of the watch as the indicator. The operation modes are switched and displayed by the combination of the mode display marks on the rotary bezel 82 and the hands of the watch.

This makes it easier to know the present mode in the small-sized portable camera. Moreover, the hands of the watch are utilized to indicate the mode, and this eliminates the necessity for a special indication means and makes it easier to display the operation mode.

The wristwatch-type camera has been explained with reference to FIGS. 10 and 11; however, the idea that the combination of the rotary control member with the mode display marks and the hands of the watch is used to switch the modes and display the present mode may also be applied to a wide variety of other information equipment.

As shown in FIG. 12, in modification examples of the first, second and third embodiments, a tilt mechanism 88 is provided at the supporting part of the taking lens 28 in order to vertically tilt the taking lens 28 in connection with the operation of the stem 26.

The electronic cameras according to the above-described embodiments record the still images; however, the present invention may also be applied to an electronic camera for recording movie images. In the case of the electronic camera for recording movie images, although a recording start/stop button such as a VTR switch should be provided instead of the release switch and other modifications should be made, the electronic camera for recording the movie images according to the present invention can achieve the same effects as the above-described embodiments.

As set forth hereinabove, the wristwatch type camera according to the present invention has the camera part that is rotatably attached to the band part. This makes it possible to turn the taking lens to a desired direction according to the object. Therefore, the angle of view can easily be adjusted at hand, and the operator does not have to take up an unnatural posture.

In particular, the image-storing start switch is not arranged at the rotary part, and thus, the image-storing can be started by operating the image-storing start switch at the same part even if the camera part is rotated.

According to the watch-type camera of the present invention, the hands of the watch represent the direction of the taking lens in the camera mode so that the operator can easily know the image-capturing direction.

According to the watch-type information equipment of the present invention provided with the watch function for analog-displaying the time and other functions, the state of the second hand is changed in the mode for displaying the information except for the time. Thus, the operator can easily identify the present mode of the information equipment by paying attention to the state of the second hand.

According to the watch-type information equipment of the present invention, the mode of the equipment is displayed on the rotary mode display member, and the hands of the watch also function as the indicator. This makes it possible to easily display the mode without providing any special indicator.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A wrist-carried camera, comprising:
   a camera part including a taking lens and an imaging device capable of converting an image of an object formed through the taking lens into an electronic image signal;
   a band part capable of being worn about a wrist of an operator; and
   a connection mechanism connecting the camera part and the band part, the connection mechanism being attached on a portion of the band part and rotatably supporting the camera part.

2. The wrist-carried camera as defined in claim 1, further comprising an image-storing start switch capable of being turned on to start to store the electronic image signal, the image-storing start switch being arranged at a stationary part regardless of rotation of the camera part on the connection mechanism.

3. The wrist-carried camera as defined in claim 1 further comprising an image-storing start switch capable of being turned on to start to store the electronic image signal, the image-storing start switch being arranged on the band part, the image-storing start switch being stationary even if the camera part is rotated on the connection mechanism.

4. The wrist-carried camera as defined in claim 1, wherein the camera part is rotatable on a normal of the portion of the band part.

5. A watch-type camera, comprising:
   a timepiece;
   a display part capable of, in a first mode, representing time by means of an hour hand, a minute hand and a second hand according to the timepiece;
   a camera part including a taking lens and an imaging device capable of, in a second mode, converting an image of an object formed through the taking lens into an electronic image signal;
   a mode switching device capable of switching the first and second modes; and
   a controller which turns at least one of the hour hand, the minute hand and the second hand to a direction of an optical axis of the taking lens when the second mode is set.

6. The watch-type camera as defined in claim 5, wherein:
   the hour hand, the minute hand and the second hand are existing members; and
   the display part comprises a mechanism driving the hour hand, the minute hand and the second hand.

7. The watch-type camera as defined in claim 5, wherein the display part comprises an electronic display which displays images of the hour hand, the minute hand and the second hand.

8. The watch-type camera as defined in claim 5, wherein the second hand stops in the second mode.

9. A watch-type camera, comprising:
   a camera part including a taking lens and an imaging device capable of, in a first mode, converting an image of an object formed through the taking lens into an electronic image signal;
   a timepiece; and
   a display part which displays an indicator to indicate a direction of an optical axis of the taking lens in the first mode, and which represents time according to the timepiece in a second mode.

10. Watch-type information equipment, comprising:

a timepiece;

a display part which represents time by means of an hour hand, a minute hand and a second hand according to the timepiece in a first mode, and at least one of the hour hand and the minute hand representing an image capturing direction in a second mode; and a controller which changes actions of the second hand in accordance with switching between the first and second modes.

11. The watch-type information equipment as defined in claim 10, wherein:

the hour hand, the minute hand and the second hand are existing members; and the display part comprises a mechanism driving the hour hand, the minute hand and the second hand.

12. The watch-type information equipment as defined in claim 10, wherein the display part comprises an electronic display which displays images of the hour hand, the minute hand and the second hand.

13. The watch-type information equipment as defined in claim 10, wherein the second hand stops in the second mode.

14. The watch-type information equipment as defined in claim 10, further comprising a camera part including a taking lens and an imaging device capable of, in the second mode, converting an image of an object formed through the taking lens into an electronic image signal.

15. Watch-type information equipment, comprising:

a timepiece;

a display part which represents time by means of an hour hand, a minute hand and a second hand according to the timepiece in a first mode, and at least one of the hour hand and the minute hand representing an image capturing direction in a second mode;

a mode display member rotatably surrounding the display part, the mode display member being provided with a plurality of marks representing operation modes in the second mode; and a controller which stops, in the second mode, at least one of the hour hand, the minute hand and the second hand to utilize the at least one of the hour hand, the minute hand and the second hand as an indicator indicating one of the marks of the mode display member.

16. The watch-type information equipment as defined in claim 15, wherein:

the hour hand, the minute hand and the second hand are existing members; and the display part comprises a mechanism driving the hour hand, the minute hand and the second hand.

17. The watch-type information equipment as defined in claim 15, wherein the display part comprises an electronic display which displays images of the hour hand, the minute hand and the second hand.

18. A method for providing watch-type image taking information, comprising:

determining whether a watch mode or a camera mode is selected;

if the watch mode is selected, turning hands of a timepiece to represent a current time and driving the hands to represent the time;

if the camera mode is selected, turning the hands of the timepiece to an image capturing direction and maintaining the hands at the capturing direction, wherein when a photo capturing is activated an image data is captured and stored.

19. A method for providing watch-type image taking information, comprising:

determining whether a watch mode or a camera mode is selected;

if the watch mode is selected, displaying and turning hands of a timepiece to represent a current time and driving the hands to represent the time;

if the camera mode is selected, further determining whether a movie-on or movie-off mode is selected, if the movie-on mode is selected disabling the display of the hands and displaying a movie image, if the movie-off mode is selected displaying only the hands and turning the hands of the timepiece to an image capturing direction and maintaining the hands at the capturing direction, wherein when a photo capturing is activated an image data is captured and stored.

* * * * *